United States Patent
Teshima et al.

(10) Patent No.: US 6,548,144 B1
(45) Date of Patent: Apr. 15, 2003

(54) SEMISPHERICAL MICROSTRUCTURE, MICROLENS AND METHOD OF FABRICATING THE SAME

(75) Inventors: Takayuki Teshima, Atsugi (JP); Takayuki Yagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,830

(22) Filed: Jul. 27, 1999

(30) Foreign Application Priority Data

Jul. 29, 1998 (JP) .......................................... 10-228667

(51) Int. Cl.$^7$ ............................................... G02B 3/00
(52) U.S. Cl. ...................... 428/138; 428/131; 428/156; 359/619; 359/621; 205/118; 205/122; 205/220; 205/188; 205/317
(58) Field of Search .................................. 428/131, 138, 428/156; 359/619, 621; 205/118, 122, 220, 188, 317

(56) References Cited

U.S. PATENT DOCUMENTS

| | | | | |
|---|---|---|---|---|
| 5,439,621 A | * | 8/1995 | Hoopman | 264/1.7 |
| 5,538,674 A | * | 7/1996 | Nisper et al. | 264/1.31 |
| 5,566,007 A | * | 10/1996 | Ikeda et al. | 359/40 |
| 6,108,062 A | * | 8/2000 | Takeuchi et al. | 349/88 |

FOREIGN PATENT DOCUMENTS

| | | | |
|---|---|---|---|
| JP | 01261601 A | * | 8/1989 |
| JP | 1-261601 | | 10/1989 |
| JP | 5-303009 | | 11/1993 |
| JP | 08258051 A | * | 8/1996 |

OTHER PUBLICATIONS

Masahiro Oikawa, et al., "A Distributed–Index Planar Micro–Lens Made of Plastics," 20(1) *Jpn. J. Appl. Phys.* pp. L51–L54 (Jan. 1981).

D. Daly, et al., "The Manufacture of Microlenses by Melting Photoresist," *Microlens Arrays* pp. 23–34 (M. C. Hutley ed., 1991).

* cited by examiner

Primary Examiner—William P. Watkins, III
(74) Attorney, Agent, or Firm—Fitzpatrick, Cella, Harper & Scinto

(57) ABSTRACT

A semispherical microstructure includes a substrate, an insulating mask layer, and an electrodeposition layer. The substrate has an electrically-conductive portion. The mask layer is formed on the electrode layer or electrically-conductive portion of the substrate and includes an opening formed in the mask layer to expose the electrically-conductive portion at the opening. The electrodeposition layer is formed of organic compound electrodeposited in the opening and on the mask layer around the opening.

22 Claims, 6 Drawing Sheets

SEMISPHERICAL MICROSTRUCTURE, MICROLENS AND METHOD OF FABRICATING THE SAME

BACKGROUND OF THE INVENTION

1. Field of the Invention

The present invention relates to a semispherical microstructure and an array of semispherical microstructures, a microlens (a semispherical microstructure usable as a lens), and a fabrication method of the semispherical microstructure. In this specification, the term "semispherical" is used in a broad sense including "semicylidrical" or the like, as well as "semispherical" in an ordinary sense or the like.

2. Description of the Related Background Art

A microlens array typically has a structure of arrayed minute lenses each having a diameter from several microns to several hundreds of microns and an approximately semispherical profile. The microlens array is usable in a variety of applications, such as liquid-crystal display devices, light receivers and inter-fiber connections in optical communcation systems.

Meanwhile, earnest developments have been made with respect to a surface emitting laser and the like which can be readily arranged in the form of an array at narrow pitches between the devices. Accordingly, there exists a great need for a microlens array with narrow lens intervals and a large numerical aperture (NA).

Likewise, a light receiving device, such as a charge coupled device (CCD), has been more and more downsized as semiconductor processing techniques develop and advance. Therefore, also in this field, the need for a microlens array with narrow lens intervals and a large NA is increasing.

In the microlens array field, a desirable structure is a microlens with a large light-condensing efficiency which can highly efficiently utilize light incident on its lens surface.

Further, similar desires exist in prospective fields of optical information processing, such as optical parallel processing-operations and optical interconnections. Furthermore, display devices of active or self-radiating types, such as electroluminescent (EL) panels, have been extensively studied and developed, and a highly-precise and highly-luminous display has been thus proposed. In such a display, a desire increases for a microlens array which can be produced at a relatively low cost and with a large area as well as with a small lens size and a large NA.

A highly-precise and highly-luminous liquid-crystal (LD) display has also been developed. Also in this field, there is an increased desire increases for a microlens array which can be produced at a relatively low cost and with a large area, and which can concentrate light into an LD portion to increase its luminance.

In those situations, there are presently various prior art methods of fabricating microlenses.

In a prior art microlens-array fabrication method using an ion exchange method (see M. Oikawa, et al., Jpn. J. Appl. Phys. 20(1) L51–54, 1981), a refractive index is raised in a distributed condition at plural places on a substrate of multi-component glass by using an ion exchange method. A plurality of lenses are thus formed at high-refractive index portions.

A method, in which photosensitive glass is thermally treated and its non-sensitized portion is crystallized to expand its surface, is also known.

In these methods, however, a lens diameter cannot be made large, compared with intervals between lenses, and it is hence difficult to design a lens with a large NA.

Further, the fabrication of a large-area microlens array is not easy since a large scale manufacturing apparatus, such as an ion diffusion apparatus, is required to produce such a microlens array.

Moreover, an ion exchange process is needed for each glass, in contrast with a molding method using a mold. Therefore, variations of lens qualities, such as a focal length, are likely to increase between lots unless the management of fabrication conditions in the manufacturing apparatus is carefully conducted. In addition to the above, the cost of this method is relatively high, as compared with the method using a mold.

Further, substrate material is limited to glass in those methods. Particularly, in the ion exchange method, alkaline ions for ion-exchange are indispensable in a glass substrate, and, therefore, the material of the substrate is limited to alkaline glass. The alkaline glass is, however, unfit for a semiconductor-based device which needs to be free of alkaline ions.

Furthermore, since a thermal expansion coefficient of the glass substrate greatly differs from that of a substrate of a light radiating or receiving device, misalignment between the microlens array and the devices is likely to occur due to a misfit between their thermal expansion coefficients as an integration density of the devices increases.

Moreover, a compressive strain inherently remains on the glass surface which is processed by the ion exchange method. Accordingly, the glass tends to warp, and hence, a difficulty of junction or bonding between the glass and the light radiating or receiving device increases as the size of the microlens array increases.

In another prior art microlens-array fabrication method using a resist reflow method (see D. Daly, et al., Proc. Microlens Arrays Teddington., p23–34, 1981), resin formed on a substrate is cylindrically patterned using a photolithography process and a microlens array is fabricated by heating and reflowing the resin. Lenses having various shapes can be fabricated at a low cost by this resist reflow method. Further, this method has no problems of thermal expansion coefficient, warp and so forth, in contrast with the ion exchange method.

Further, in this method, the resist is directly patterned on a device, such as the surface emitting laser, and reflowed. Hence, the microlens can be formed directly on the device and an alignment process of bonding the microlens and the device can be omitted.

In the resist reflow method, however, the profile of the microlens is strongly dependent on the thickness of resin, wetting condition between the substrate and resin, and heating temperature. Therefore, variations between lots are likely to occur while a fabrication reproducibility per a single substrate surface is high.

Further, when adjacent lenses are brought into contact with each other due to the reflow, a desired lens profile cannot be secured due to the surface tension. Accordingly, it is difficult to achieve a high light-condensing efficiency by bringing the adjacent lenses into contact and reducing an unused area between the lenses. Furthermore, when a lens diameter from about 20 or 30 microns to about 200 or 300 microns is desired, the thickness of deposited resin must be large enough to obtain a spherical surface by the reflow. It is, however, difficult to uniformly and thickly deposit the resin material having desired optical characteristics (such as refractive index and optical transmissivity). Thus, it is difficult to produce a microlens with a large curvature and a relatively large diameter.

In another prior art method, an original plate of a microlens is fabricated, lens material is deposited on the original plate and the deposited lens material is then separated. The original plate or mold is fabricated by an electron-beam lithography method (see Japanese Patent Application Laid-Open No. 1 (1989)-261601), or a metal-plate etching method (see Japanese Patent Application Laid-Open No. 5 (1993)-303009). In these methods, the microlens can be reproduced by molding, variations between lots are unlikely to occur, and the microlens can be fabricated at a low cost. Further, the problems of alignment error and warp due to the difference in the thermal expansion coefficient can be solved, in contrast with the ion exchange method.

In the electron-beam lithography method, however, an electron-beam lithographic apparatus is expensive and a large amount of investment in equipment is hence needed. Further, it is difficult to fabricate a mold having a large area more than 100 $cm^2$ (10 cm-square) because the electron beam impact area is limited.

Further, in the metal-plate etching method, since an isotropic etching using a chemical action is principally employed, an etching of the metal plate into a desired profile cannot be achieved if composition and crystalline structure of the metal plate vary even slightly. In addition, etching will continue unless the plate is washed immediately after a desired shape is obtained. When a minute microlens is to be formed, a deviation of the shape from a desired one is possible due to an undesired etching which continues during a period lasting from when the desired profile is obtained to the time when the metal plate is washed.

SUMMARY OF THE INVENTION

An object of the present invention is to provide a simple, flexible and stable method of fabricating a semispherical microstructure (typically a microlens such as a semispherical microlens, a fly-eye lens and a lenticular lens), and a semispherical microstructure, and more particularly to provide a method of fabricating a semispherical microstructure including a microlens, microlens array and/or semispherical microlens (i) which can be readily increased in size or area, (ii) with good controllability and at a relatively low cost, (iii) with a desired radius of curvature, and (iv) formable directly on a device.

The present invention is generally directed to a a method of fabricating a semispherical microstructure comprising providing an electrically-conductive portion of a substrate; and electrodepositing an electrodepositable organic compound on said electrically conductive portion to form a semispherical microstructure.

In addition, the present invention includes a semispherical microstructure comprising a substrate with an electrically-conductive portion and an electrodeposited organic compound on said electrically-conductive portion of said substrate.

In a second embodiment the invention includes a semispherical microstructure comprising a substrate having an electrically-conductive portion; an insulating mask layer on said electrically-conductive portion of said substrate; said insulating mask layer including a first opening therein to expose said electrically-conductive portion; and an electrodeposited organic compound layer formed in said first opening and on said mask layer.

In one embodiment the method can include the steps of:

preparing a substrate with an electrically-conductive portion;

forming an insulating mask layer on the electrically-conductive portion;

forming a first opening in the mask layer to expose the electrically-conductive portion; and electrodepositing an electrodeposition layer of an electrodepositable organic compound portion in the first opening and on the mask layer employing the electrically-conductive portion as an electrode.

DESCRIPTION OF THE PREFERRED EMBODIMENTS

The fabrication principle of a semispherical microstructure or microlens of the present invention will be further described with reference to a preferred embodiment illustrated in FIGS. 1A–1D.

Figure 1A:
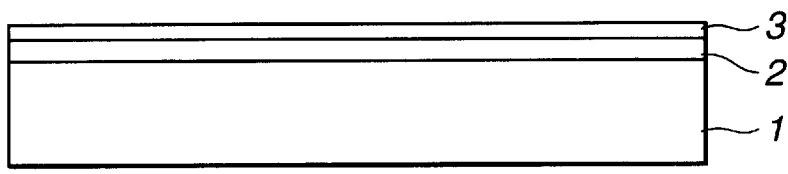
FIGS. 1A–1D are cross-sectional views illustrating electrodeposition growth steps in a fabrication method of a semispherical microstructure or microlens of a first embodiment according to the present invention, respectively.

As illustrated in FIG. 1A, an electrode layer 2 is formed on a substrate 1, and a mask layer 3 is further formed on the electrode layer 2. Any material, such as metal, semiconductor (a silicon wafer or the like) and insulating substance (such as glass, quartz and polymeric film), can be used as the substrate material. When a metal is used as substrate 1, there is no need to form the electrode layer, since the metal already has a conductive portion. Further, when a semiconductor is used, the electrode layer is not necessarily needed if the semiconductor has enough conductivity to permit the electrodeposition. However, where a metal or semiconductor is used as the substrate, an electrodeposition layer will also be formed on a portion other than the semispherical microstructure forming portion, since the entire substrate is immersed in electrodeposition solution. Therefore, when the electrodeposition layer is desired to be formed on a predetermined portion only, an insulating substance can be preferably used as the substrate. Alternatively, a metal or semiconductor, whose surface is partially insulated, may also be used.

Accordingly, as emplyed herein, the phrase "a substrate with an electrically conductive portion" includes, inter alia, a conductive substrate of a metal, semiconductor or the like, a substrate having an electrode layer thereon, a conductive or insulative substrate whose surface is partially insulated or conductive, respectively, or the like.

The material of the electrode layer 2 is selected from materials which are not corrosive to the electrodeposition liquid used since the electrode layer 2 is exposed to the electrodeposition solution. The mask layer 3 must have an insulating property to insulate the electrode layer 2 from the electrodeposition solution during electrodeposition. The mask layer may be formed of any inorganic or organic insulating material which is not corroded by and/or is inert to the electrodeposition solution.

Figure 1B:
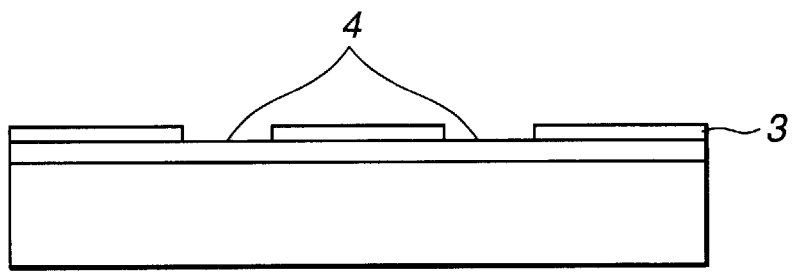

An opening 4 is then formed in the mask layer 3 as illustrated in FIG. 1B. Although the opening 4 has a circular shape herein, the opening can have an appropriate shape as needed (for example, an elliptical shape when an anamorphic microlens is to be fabricated). An electrodeposition layer is initially formed in the opening 4 and expanded onto the mask layer 3. In the case of the circular opening 4, a microlens with a smaller radius can be formed by decreasing the diameter of the opening 4. The circular opening 4 can be formed in the mask layer 3 by semiconductor photolithography process and etching which can form a minute opening. When the mask layer 3 is formed of photoresist, the etching process can be eliminated.

Figure 1C:
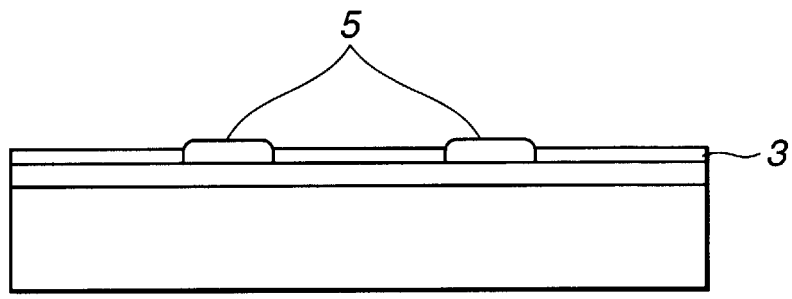
Figure 1D:
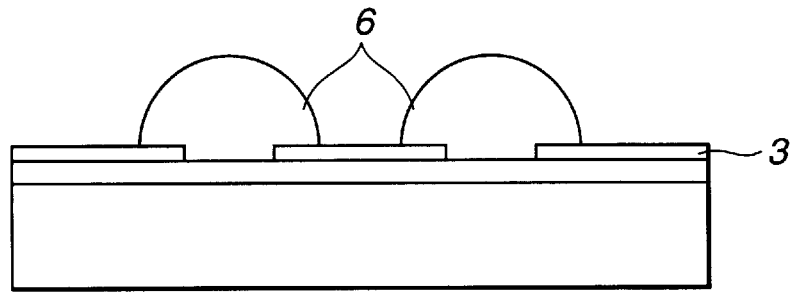
Figure 2:
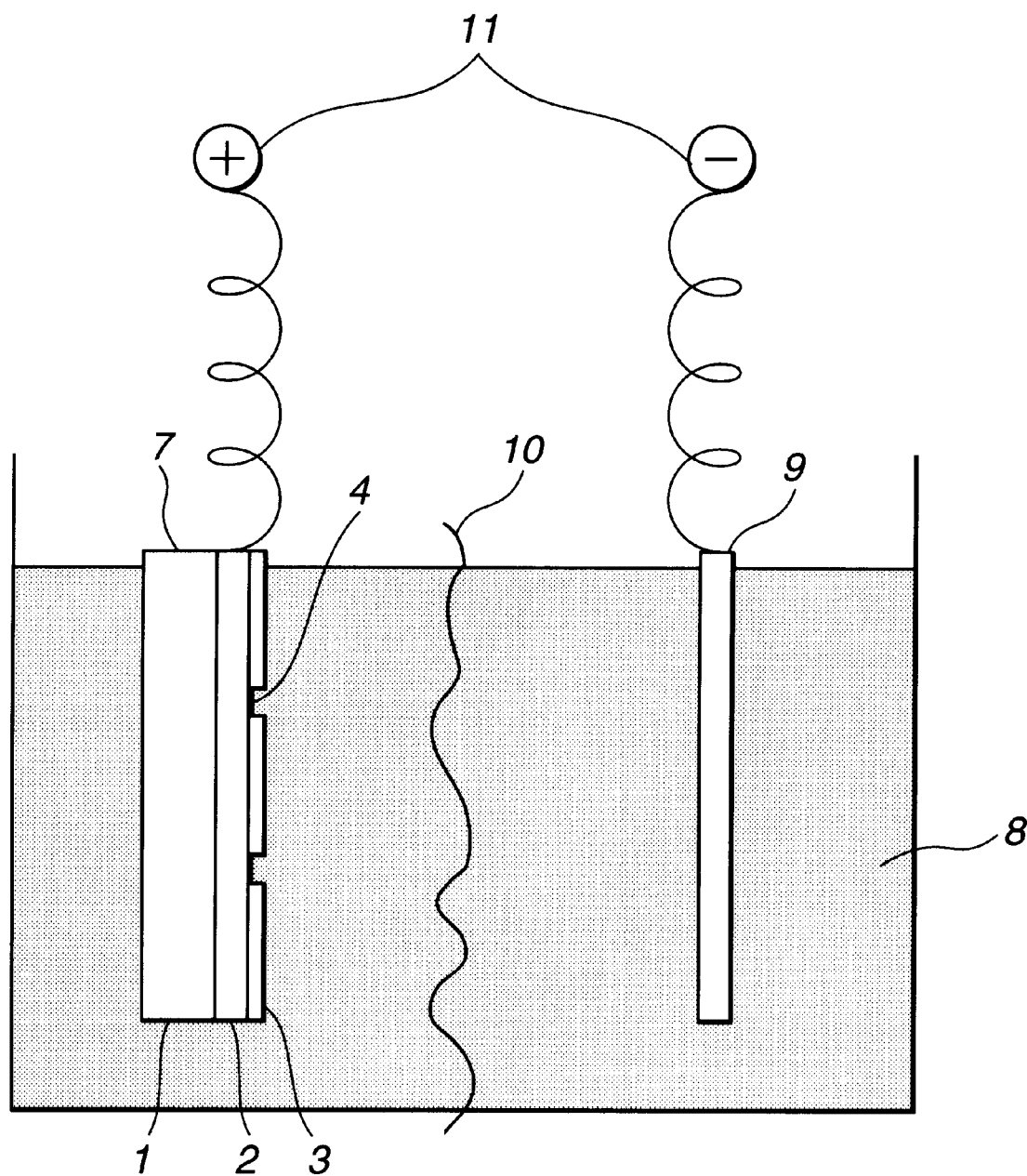
FIG. 2 is a cross-sectional view illustrating an anion-type electrodeposition apparatus used in the first embodiment.

An anion-type electrodeposition apparatus is illustrated in FIG. 2. The substrate with the opening 4 acting as a base 7 is immersed in an electrodeposition liquid 8, and the base 7 and a cathode plate 9 are connected to an external power source 11 to cause a current flow through the electrodeposition liquid 8. As shown in FIG. 1C electrodeposition layer 5 is thus formed in the opening 4. Layer 5 as electrodeposited in opening 4 as shown in FIG. 1C extends onto the mask layer 3 as illustrated in FIG. 1D as the electrodeposition proceeds. Thus, a semispherical structure 6 shown in FIG. 1D is formed.

Figure 4:
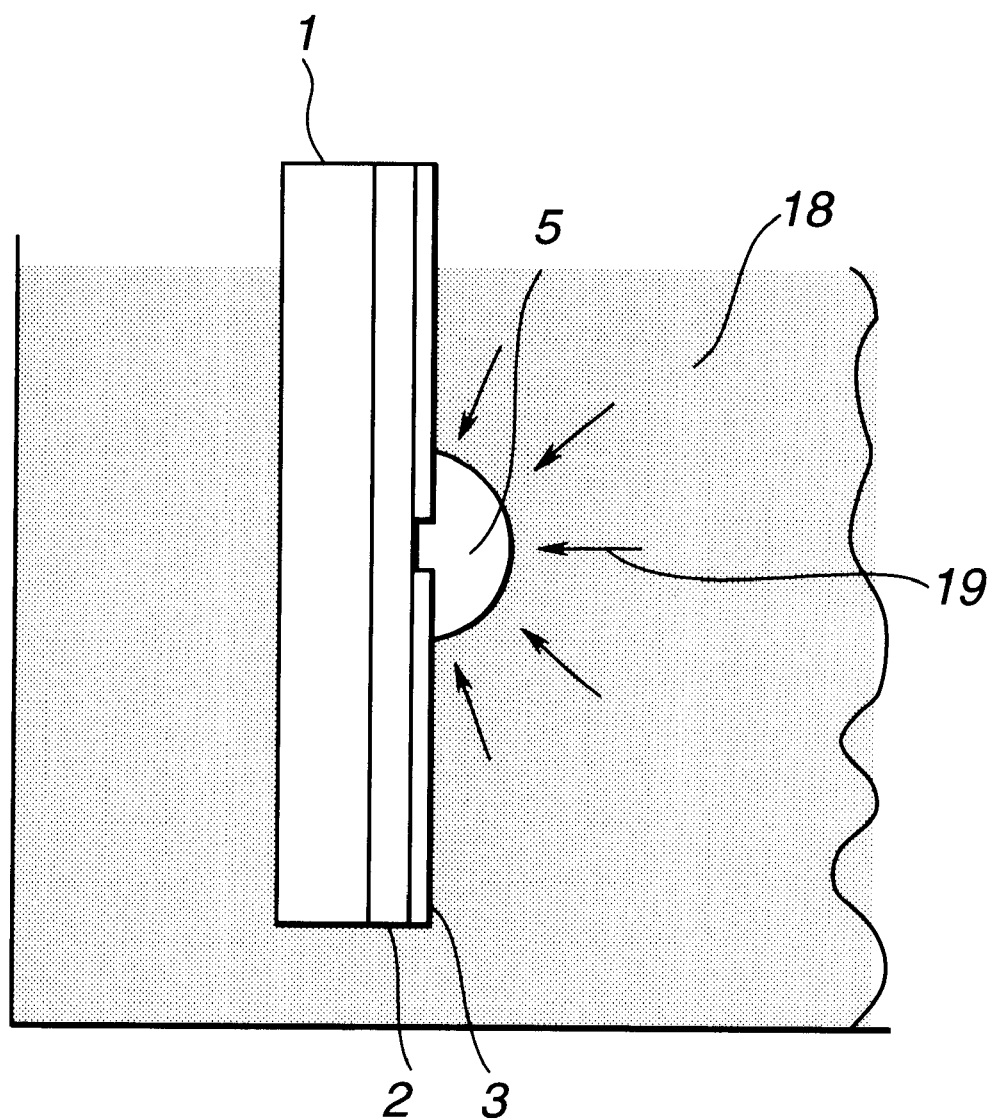
FIG. 4 is a cross-sectional view illustrating a fabrication principle of a semispherical structure or the like using electrodeposition according to the present invention.

When electrodeposition is carried out on the minute opening 4 in the electrodeposition solution 8, electrodeposition agent 19 (dissolved or dispersed in water) in an electrodeposition bath 18 is concentrated onto the electrodeposition layer 5 as illustrated in FIG. 4 and deposition of the organic compound advances isotropically. A semispherical structure 6 is thus formed. The electrodeposition layer 5 grows isotropically since the area of the opening 4 is sufficiently smaller than that of a cathode plate 9 and electrodeposition substance is dissolved in the electrodeposition liquid 8. The size of each microlens in a microlens array ranges from about 2 to 3 microns to about 200 to 300 microns, and the size of the opening 4 needs to be smaller than the diameter of a desired microlens. In order to better achieve an isotropical growth of the electrodeposition layer 5, the size of the opening 4 is less than the diameter of the semispherical structure 6. Thus, the profile of the semispherical structure 6 comes close to a true sphere. This holds true when a semicylindrical structure, such as a lenticular lens, and the like are to be fabricated.

The thus-fabricated semispherical microstructure can be used as a microlens without any change when the substrate 1 is made of transparent material. Where only a lens portion is used, the lens portion is separated from the substrate 1, electrode layer 2 and mask layer 3. For this purpose, the semispherical structure 6 is separated at an interface between the substrate 1 and the electrode layer 2 or between the electrode layer 2 and the mask layer 3 (in the latter case, between the semispherical structure 6 and the electrode layer 2 in the opening 4). A sacrificial layer, which can be readily removed by etching, may be formed between the substrate 1 and the electrode layer 2 to achieve separation at the interface between the substrate 1 and the electrode layer 2.

The thickness of the electrodeposition layer 5 can be readily controlled by controlling the electrodeposition time and temperature. When the electrodeposition time is sufficiently prolonged, adjacent semispherical structures 6 can be continuously formed.

As the electrodeposition substance, there are employed acryl-series carboxylic acid resin and the like in the case of the anionic-type electrodeposition, and epoxy-series resin and the like in the case of the cationic-type electrodeposition. At any rate, any material capable of being electrodeposited can be used.

As the electrode layer 2, a transparent electrode formed of ITO (Indium Tin Oxide), $SnO_2$ or the like can be used. The electrode layer 2 may also be formed of non-light-transmitting material. In this embodiment, another opening is preferably formed in the electrode layer 2 in alignment with the opening 4 in the mask layer 3. The former opening must be coincident with or smaller than the latter opening 4. In such a structure, crosstalk of incident light between adjacent portions can be reduced by the presence of the electrode layer 2 with the opening. This electrode layer 2 can also act as a stop for emitting light when the surface emitting laser or the like is provided, for example, on the substrate 1.

Further, where the electrode layer 2 is provided under the electrodeposited structure 6, charging of a device below the electrode layer 2 can be suppressed and a breakdown of the device due to electrostatic charging can be eliminated.

The method may further include a step of separating at least the substrate with an electrically-conductive portion from the electrodeposition layer. The semispherical microstructure can be made into a configuration which chiefly has the electrodeposition layer of the organic compound with a desired profile only.

The substrate with an electrically conductive portion can be an electrically conductive substrate or a substrate with an electrode layer. The electrically conductive substrate can be a substrate with an electrically conductive layer.

The method may further include a step of forming a second opening in the electrically-conductive portion in alignment with the first opening. In this case, the semispherical microstructure can be readily employed as it is since there is no electrode layer or conductive portion at a place corresponding to a main portion of the organic compound electrodeposition layer. Further, when the second opening is coincident with or smaller than the first opening in this case, the electrodeposition layer can be readily shaped into a desired profile. The semispherical microstructure can be readily used as a microlens.

When a plurality of the first openings are formed in the mask layer (plural second openings may also be formed corresponding to these first openings), a semispherical microstructure array or microlens array can be readily formed.

The first opening may have a circular shape or an elongated rectangular shape. A spherical or lenticular lens can be thereby formed.

The first opening can be shaped into such a small or thin shape that the electrodeposition layer is isotropically electrodeposited with respect to a center or center line of the first opening.

The size and profile of the electrodeposition layer can be flexibly controlled by controlling the electrodeposition time and temperature.

The substrate can be composed of one of silicon, glass, quartz or a polymeric substance.

When material of the semispherical microstructure is appropriately selected, the semispherical microstructure is usable typically as a spherical or lenticular lens.

When the semispherical microstructure is used as a microlens, following configurations can be adopted according to its application:

The organic compound portion is transparent in a wavelength range of light to be used for the semispherical microstructure. The mask layer is transparent or opaque in the wavelength range. The electrode layer or electrically-conductive layer is transparent in the wavelength range. The substrate is transparent or opaque in the wavelength range.

An optical device may be formed at a portion of the substrate in alignment with the first opening. In this case, the electrode layer or electrically-conductive layer must be transparent in the above wavelength range unless the second opening is formed therein.

As described above, a feature of a fabrication method of a semispherical microstructure or microlens of the present invention is that an organic compound is electrodeposited at an exposed conductive portion having a sufficiently small or thin area. Such a conductive portion is typically a minute or thin opening formed in the mask layer provided on the electrode layer. In order to precisely fabricate a lens having a desired radius of curvature, it is preferable to meet a relation of $\phi \leq 0.35R$ where $\phi$ is the diameter or width of the opening and R is the radius of curvature of the electrode-posited organic compound directly above the opening. Or, the diameter or width ($\phi$) of the opening is preferably $\phi \leq 10$ $\mu$m. Herein, the relation of $\phi \leq 0.35R$ is especially significant when the diameter or width ($\phi$) of the opening is above 10 $\mu$m.

During electrodeposition on such a minute opening the electrodeposition layer is initially precipitated in the opening. Thereafter, the electrodeposition layer further grows over and beyond the opening and the mask layer as the electrodeposition proceeds. Where the opening size is sufficiently small as compared with the size of an electrode with an opposite polarity, the electrodeposition layer isotropically grows with respect to a center or center line of the opening and the electrodeposition layer with a profile of a semisphere, semicylinder or the like is formed. When the opening has a circular shape, the electrodeposition layer with a semispherical profile can be obtained.

The size of the opposed electrode is not particularly limited. This size can be typically set to approximately equal to the size of a lens array substrate to be fabricated. For example, where a lens array with seven hundred (700) microlenses arrayed on a substrate having an area of 4 cm² (2 cm-square) is to be fabricated, the diameter or width of the opening formed in the mask is about 10 $\mu$m while the size of the opposed electrode being 4 cm². Herein, the diameter or width of the opening can be said to be sufficiently small relative to the size of the opposed electrode.

When at least the electrodeposition layer of organic compound and the electrode layer are made of light-transmitting material, the semispherical microstructure can be used as a microlens without any change. Further, an unwanted profile error, caused by overetching proceeding until the washing, can be prevented, since the precipitation of the electrodeposition layer can be stopped by terminating a current flow between the anode and the cathode at the point where a desired profile is obtained. This feature of preventing overetching is not employable with the method of forming a mold by etching. Accordingly, controllability of the fabrication is superior to the prior art method.

Further, the semispherical microstructure or microlens can be directly formed on the substrate or device by electrodeposition. Therefore, no expensive equipment is needed, fabrication cost can be reduced, and the size or area of the semispherical microstructure or microlens can be enlarged readily. Furthermore, the size or profile of the electrodeposition layer can be controlled by varying the electrodeposition time and/or temperature using in situ observation (using a microscope, for example), and the lens diameter and the like can be readily and precisely controlled.

Since the electrodeposition layer can be grown isotropically, a lens with a large curvature can be obtained, for example. Where the electrodeposition layer or the conductive portion is formed of non-light-transmitting material, crosstalk between adjacent portions can be reduced, This non-light-transmitting portion can act as a stop when provided on a surface emitting laser, for example.

These advantages and others will be more readily understood from the following detailed description of certain preferred embodiments in conjunction with the drawings.

A preferred embodiment of a semispherical microstructure and a fabrication method of the semispherical microstructure will be described with reference to FIGS. 1A–1D and 2.

A quartz substrate with a diameter of four inches is used as a substrate 1 illustrated in FIGS. 1A–1D. An ITO with a thickness of 1000 Å is then deposited on the quartz substrate 1 using a vacuum sputtering method which is one of thin-film forming methods. An electrode layer 2 is thus formed.

A solution of aromatic polyamic acid is spin-coated on the substrate 1 and then thermally treated to form a mask layer 3 of polyimide.

Further, deposition, exposure and development of photoresist are performed using photolithography to form an opening in the resist. The mask layer 3 at the resist opening is etched by a reactive ion etching using oxygen. Thus, the electrode layer 2 is exposed and an opening 4 is formed. The photoresist is removed thereafter.

Herein, the opening 4 has a circular shape and a diameter of 10 $\mu$m. The openings 4 are arranged at intervals of 200 $\mu$m in a 500×500 matrix pattern.

As illustrated in FIG. 2, this quartz substrate is used as a base 7, the electrode layer 2 is used as an anode, and an anion-type electrodeposition bath 8 containing acrylic compound is used. The electrodeposition is thus performed at a bath temperature of 25° C. and an anode current density of 50 mA/dm² as illustrated in FIG. 2. In FIG. 2, a cathode plate 9 and a diaphragm 10 are in electrodeposition bath 8. Reference numeral 11 denotes an external power source. An electrodeposition layer 5 is initially precipitated in the opening 4 and grown therein as illustrated in FIG. 1C. The electrodeposition layer 5 then expands onto the mask layer 3, and the electrodeposition layer with a semispherical profile 6 is thus formed as illustrated in FIG. 1D. The electrodeposition layer 5 is grown until a radius of the semisphere reaches about 50 $\mu$m. This measurement is conducted using a microscope, for example.

The substrate 1 with the electrodeposition layer 5 is washed, air-blown and dried to form a semispherical microstructure or microlens. Thus, a semispherical microstructure or microlens composed of acrylic resin as the organic compound can be fabricated by a highly-controllable and inexpensive method without using high-cost equipment. A lens focal point was measured by projecting parallel light through a surface of the microlens substrate 1. A lens radius calculated from the focal point was confirmed to be equal to a radius obtained by measuring it from an upper face of the substrate 1. Thus, a microlens with a small radius of curvature (a large curvature), i.e., a large NA, can be formed directly on the substrate 1.

Figure 3:
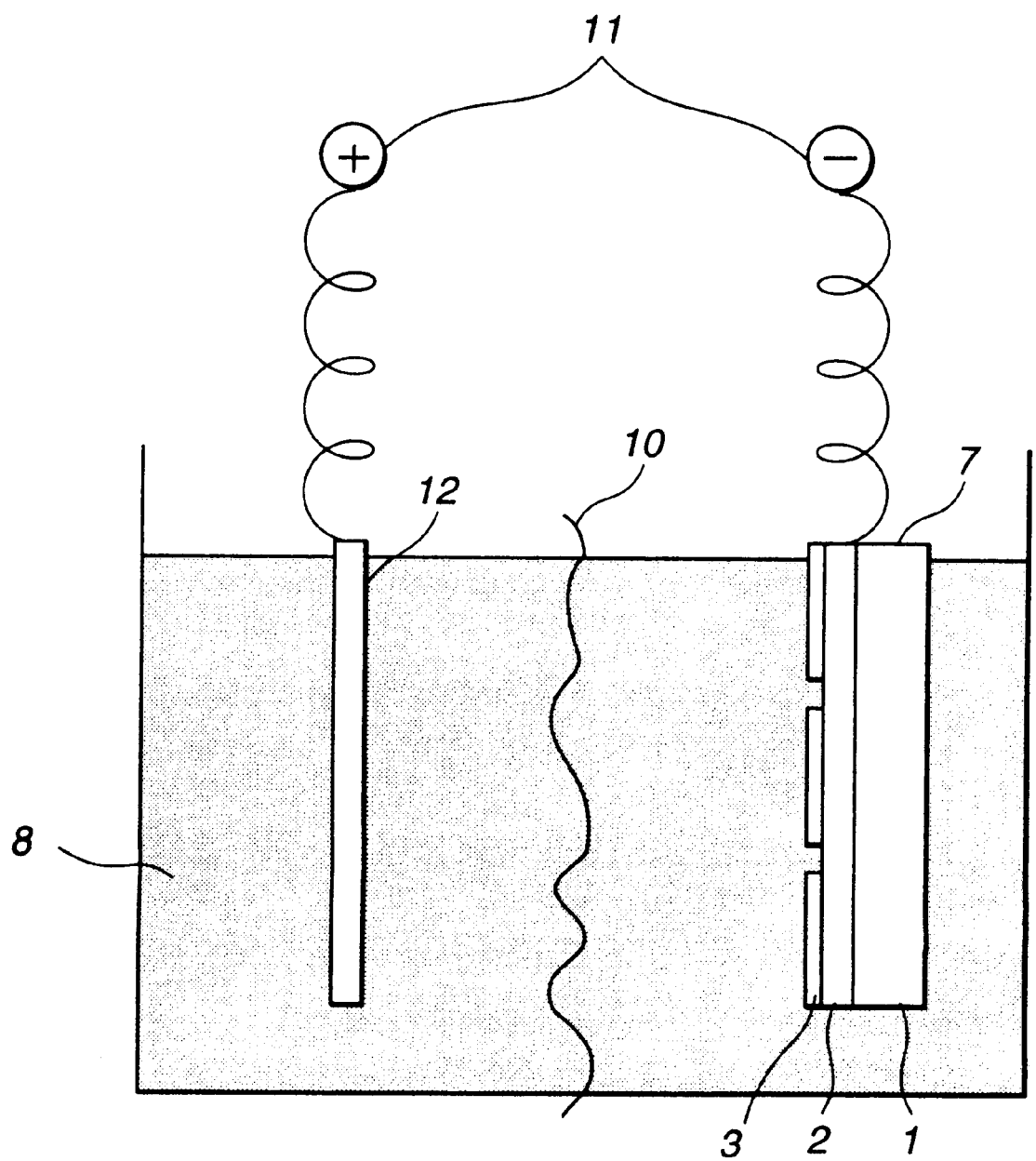
FIG. 3 is a cross-sectional view illustrating a cation-type electrodeposition apparatus used in the second embodiment.

A second preferred embodiment of a semispherical microstructure and a fabrication method of the semispherical microstructure will be described with reference to FIGS. 1A–1D and 3. In FIG. 3, the same or similar portions or elements to those in FIG. 2 are designated by the same reference numerals.

The base 7 of the quartz substrate is formed as described in the first preferred embodiment. As illustrated in FIG. 3, the quartz substrate is used as the base 7; the electrode layer 2 is in turn used as a cathode, and a cation-type electrodeposition bath 8 containing an epoxy compound is used. The electrodeposition is thus performed at a bath temperature of 25° C. and an anode current density of 50 mA/dm$^2$ as illustrated in FIG. 3. In FIG. 3, reference numeral 12 denotes an anode plate.

The electrodeposition layer 5 is initially precipitated in the opening 4 and grown therein. The electrodeposition layer 5 expands onto the mask layer 3, and the electrodeposition layer 5 with the semispherical profile 6 is thus formed as illustrated in FIG. 1D. The electrodeposition layer 5 is grown until a radius of the semisphere reaches about 50 μm. This measurement is also conducted using a microscope, for example.

The substrate 1 with the electrodeposition layer 5 is washed, air-blown and dried to form a semispherical microstructure or microlens. Thus, a transparent semispherical microstructure or microlens composed of epoxy resin can be fabricated by a highly-controllable and inexpensive method without using high-cost equipment, as in the first embodiment. A lens focal point was measured by projecting parallel light through a surface of the microlens substrate 1. A lens radius calculated from the focal point was confirmed to be equal to a radius obtained by measuring it from an upper face of the substrate 1. Thus, a microlens with a small radius of curvature can be formed directly on the substrate 1, similarly to the first embodiment.

A third preferred embodiment of a semispherical microstructure and a fabrication method of the semispherical microstructure will be described with reference to FIGS. 5A–5G and 6. A quartz substrate with a diameter of four inches is used as a substrate 21 illustrated in FIGS. 5A–5G. Cr and Au are then deposited on the quartz substrate 21 with thicknesses of 50 μm and 1000 μm, respectively, using an electron-beam evaporating method which is one of thin-film forming methods. Thus, an electrode layer 22 is formed.

Figure 5A:
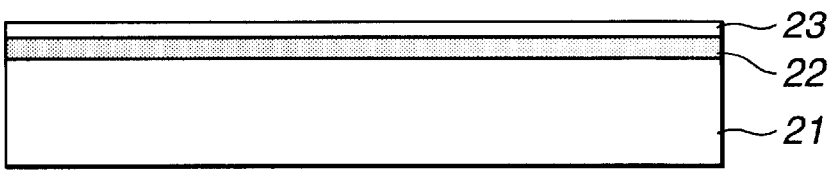
FIGS. 5A–5G are cross-sectional views illustrating electrodeposition growth steps in a fabrication method of a semispherical microstructure or microlens of a third embodiment according to the present invention, respectively.

A solution of aromatic polyamic acid is spin-coated on the electrode layer 22 and thermally treated to form a mask layer 23 of polyimide as illustrated in FIG. 5A.

Figure 5B:
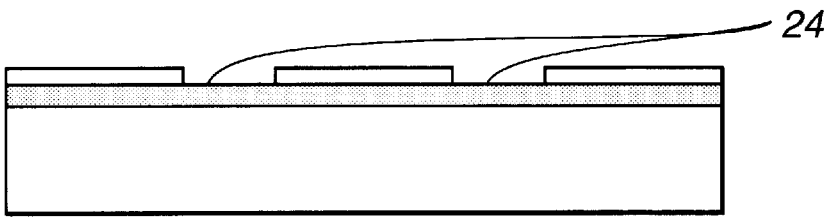

Further, deposition, exposure and development of photoresist are performed using photolithography to form an opening in the resist. The mask layer 23 at the resist opening is etched by the reactive ion etching using oxygen. Thus, the electrode layer 22 is exposed and an opening 24 is formed as illustrated in FIG. 5B. The photoresist is removed thereafter.

Figure 5C:
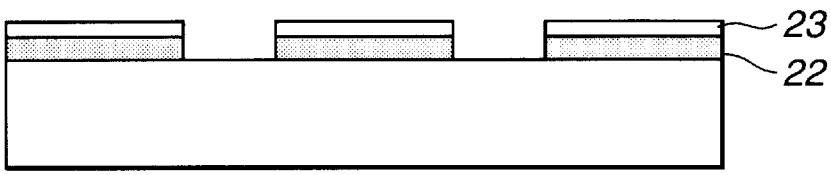

Herein, the opening 24 has a circular shape and a diameter of 10 μm. The openings 24 are arranged at intervals of 200 μm in a 500×500 matrix pattern. The gold (Au) of the electrode layer 22 exposed through the opening 24 is then etched and removed by a mixture solution of iodine and potassium iodide. The thus-exposed Cr of the electrode layer 22 is then etched and removed with a mixture solution of ammonium cerium (IV) nitrate and perchloric acid as illustrated in FIG. 5C.

Figure 5D:
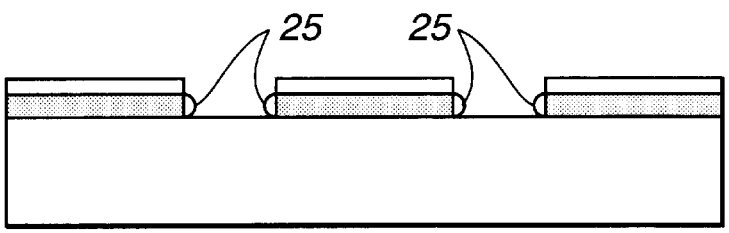
Figure 5E:
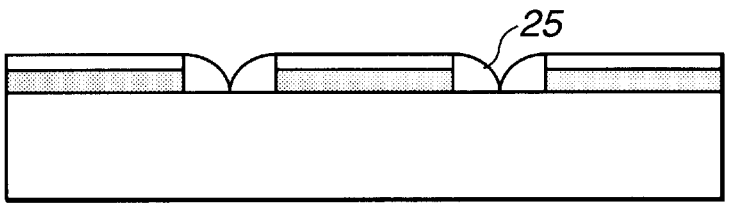
Figure 5F:
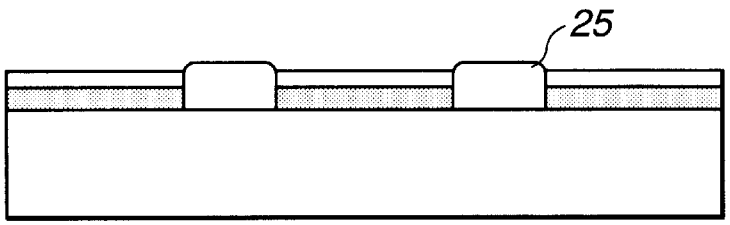
Figure 6:
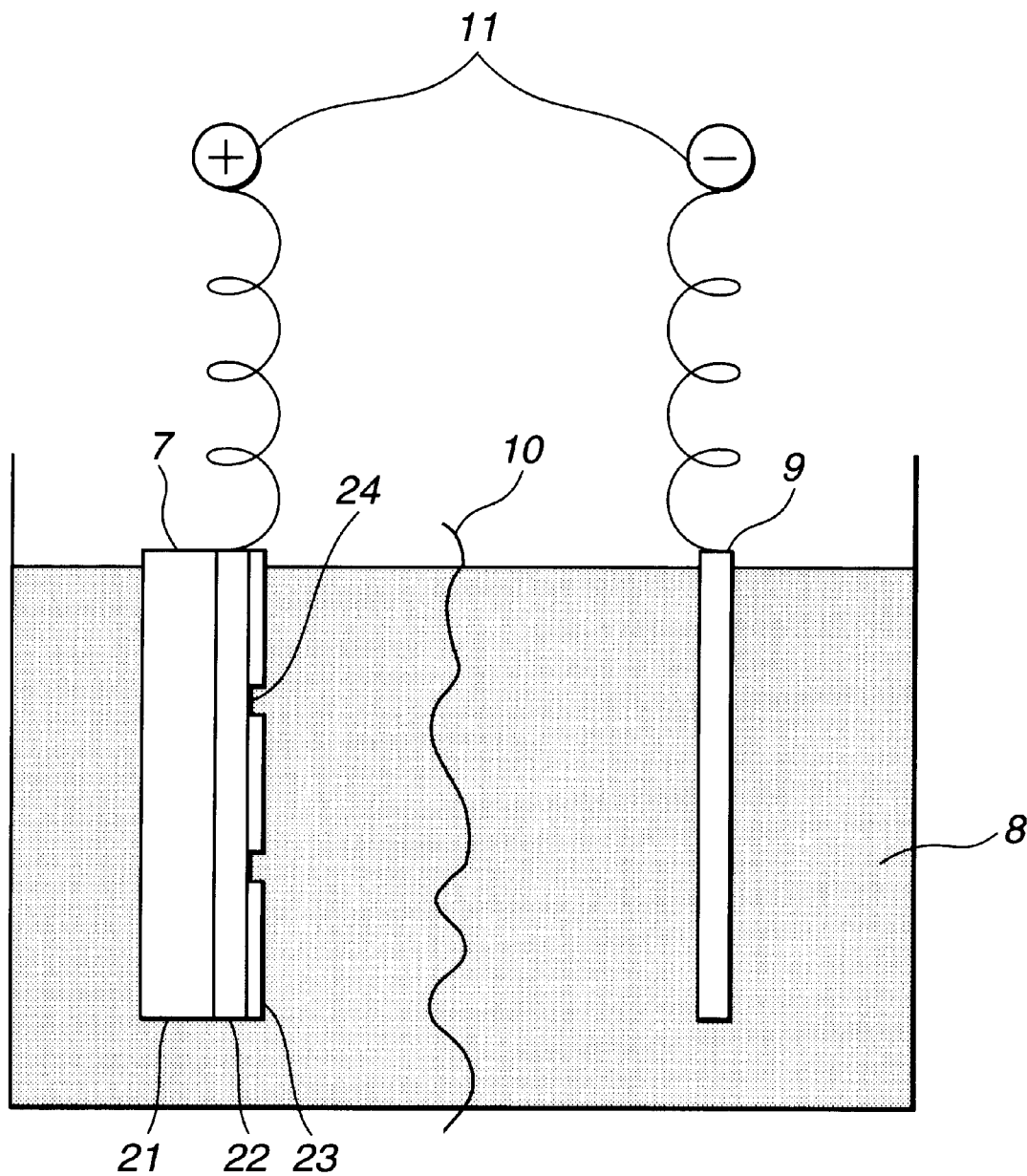
FIG. 6 is a cross-sectional view illustrating the anion-type electrodeposition apparatus used in the third embodiment.

This quartz substrate is used as the base 7, the electrode layer 22 is used as an anode, and an anion-type electrodeposition bath containing acrylic compound is used. The electrodeposition is thus performed at a bath temperature of 25° C. and an anode current density of 50 mA/dm$^2$ as illustrated in FIG. 6. An electrodeposition layer 25 is initially precipitated in the opening 24 and grown therein (see FIGS. 5D–5F). The layer 25 is deposited on the side face of the electrode layer 22 at the beginning of the electrodeposition as shown in FIG. 5D, and gradually grows toward the center of the opening 24 as illustrated in FIGS. 5E and 5F.

Figure 5G:
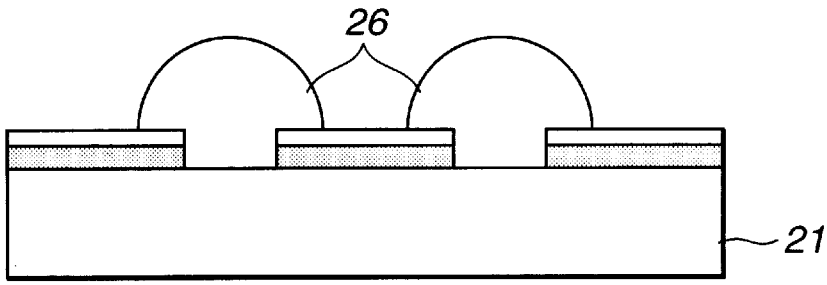

The electrodeposition layer 25 further expands onto the mask layer 23, and the electrodeposition layer 25 with a semispherical profile 26 is finally formed as illustrated in FIG. 5G. The electrodeposition layer 25 is grown until a radius of the semisphere reaches about 50 μm.

The substrate 21 with the electrodeposition layer 25 is washed, air-blown and dried to form a semispherical microstructure or microlens. Thus, a semispherical microstructure or microlens composed of acrylic resin can be fabricated by a highly-controllable and inexpensive method without using high-cost equipment, like the above embodiments. A lens focal point was measured by projecting parallel light through a surface of the microlens substrate 21. A lens radius calculated from the focal point was confirmed to be equal to a radius obtained by measuring it from an upper face of the substrate 21. Thus, a microlens with a small radius of curvature (a large curvature), i.e., a large NA, can be formed directly on the substrate 21, like the above embodiments.

As described in the foregoing, an electrodeposition layer is formed in a minute or thin opening formed in at least a mask layer provided on an electrode layer or conductive portion to form a semispherical microstructure with a semispherical profile or the like in the fabrication method of a semispherical microstructure according to this invention. The exact semispherical profile can be controlled by the current flowing in the elecrodeposition bath, and, hence, a desired semispherical microstructure or microlens can be obtained.

Further, an area of the semispherical microstructure or microlens array can be readily enlarged without using any large-scale fabrication equipment. Thus, the semispherical microstructure or microlens array can be fabricated at a relatively low cost. Furthermore, a microlens or the like with a desired refractive index can be designed by appropriately selecting the organic electrodeposition material, The microlens or the like can be formed directly on a device (this is formed on a substrate or the like). Therefore, an alignment process requiring bonding the microlens or the like and the device can be omitted, and a breakdown of the device due to electrostatic charging can be avoided.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A semispherical microstructure comprising:
   a substrate having an electrically-conductive portion;
   an insulating mask layer on said electrically-conductive portion of said substrate, said insulating mask layer including a first opening therein to expose said electrically-conductive portion; and
   an electrodeposited organic compound layer formed in said first opening and on said mask layer, said electrodeposited organic compound layer having an isotropic shape with respect to a center of the first opening.

2. A semispherical microstructure according to claim 1, wherein said substrate having the electrically conductive portion is an electrically conductive substrate.

3. A semispherical microstructure according to claim 1, wherein said substrate having the electrically conductive portion is a substrate with an electrode layer thereon.

4. A semispherical microstructure according to claim 3, wherein said insulating mask layer is on the electrode layer and the first opening exposes the electrode layer.

5. A semispherical microstructure according to claim 1, wherein said organic compound is an organic compound capable of being electrodeposited.

6. A semispherical microstructure according to claim 1, wherein a second opening is formed in said electrode layer or electrically-conductive portion in alignment with said first opening.

7. A semispherical microstructure according to claim 6, wherein said second opening is coincident with or smaller than said first opening.

8. A semispherical microstructure according to claim 1, wherein a plurality of said first openings are formed in said mask layer.

9. A semispherical microstructure according to claim 8, wherein a plurality of said electrodeposition layers are formed in and around said first openings, respectively.

10. A semispherical microstructure according to claim 1, wherein said first opening has a circular shape.

11. A semispherical microstructure according to claim 1, wherein said first opening has an elongated rectangular shape.

12. A semispherical microstructure according to claim 1, wherein said substrate is silicon, glass, quartz or a polymeric substance.

13. A semispherical microstructure according to claim 1, in the form of a microlens.

14. A semispherical microstructure according to claim 1, wherein said organic compound portion is transparent in a wavelength range of light selected for use for said semispherical microstructure.

15. A semispherical microstructure according to claim 1, wherein said mask layer is transparent in a wavelength range of light selected for use for said semispherical microstructure.

16. A semispherical microstructure according to claim 1, wherein said organic compound portion is opaque in a wavelength range of light selected for use for said semispherical microstructure.

17. A semispherical microstructure according to claim 1, wherein said electrode layer or electrically-conductive layer is transparent in a wavelength range of light selected for use for said semispherical microstructure.

18. A semispherical microstructure according to claim 1, wherein said electrode layer or electrically-conductive layer is opaque in a wavelength range of light selected for use for said semispherical microstructure.

19. A semispherical microstructure according to claim 1, wherein said substrate is transparent in a wavelength range of light selected for use for said semispherical microstructure.

20. A semispherical microstructure according to claim 1, wherein said substrate is opaque in a wavelength range of light selected for use for said semispherical microstructure.

21. A semispherical microstructure according to claim 1, wherein an optical device is arranged at a portion of said substrate in alignment with said first opening.

22. A semispherical microstructure according to claim 1, wherein said mask layer comprises a photoresist layer.

* * * * *